United States Patent
Keller (10) Patent No.: US 7,350,102 B2
(45) Date of Patent: Mar. 25, 2008

(54) COST REDUCTION SCHEMA FOR ADVANCED RAID ALGORITHMS

(75) Inventor: Steven M. Keller, Los Gatos, CA (US)

(73) Assignee: International Business Machine Corporation, Armonk, NY (US)

( * ) Notice: Subject to any disclaimer, the term of this patent is extended or adjusted under 35 U.S.C. 154(b) by 478 days.

(21) Appl. No.: 10/926,865

(22) Filed: Aug. 26, 2004

(65) Prior Publication Data

US 2006/0048003 A1 Mar. 2, 2006

(51) Int. Cl.
  *G06F 11/00* (2006.01)
(52) U.S. Cl. .................. 714/6; 714/5; 711/114
(58) Field of Classification Search .......... 711/114, 711/162; 714/5, 6
  See application file for complete search history.

(56) References Cited

U.S. PATENT DOCUMENTS

| | | | |
|---|---|---|---|
| 6,421,760 B1 | 7/2002 | McDonald et al. | |
| 6,859,896 B2* | 2/2005 | Apperley et al. | 714/48 |
| 6,970,974 B2* | 11/2005 | Isobe et al. | 711/114 |
| 7,028,216 B2* | 4/2006 | Aizawa et al. | 714/7 |
| 7,047,354 B2* | 5/2006 | Yagisawa et al. | 711/112 |
| 7,057,981 B2* | 6/2006 | Kano et al. | 369/30.28 |
| 7,085,953 B1* | 8/2006 | Hsu et al. | 714/5 |
| 7,103,798 B2* | 9/2006 | Morita | 714/6 |
| 7,152,146 B2* | 12/2006 | Satoyama et al. | 711/162 |
| 2002/0099914 A1 | 7/2002 | Masunami et al. | |
| 2002/0194428 A1 | 12/2002 | Green | |
| 2003/0110330 A1 | 6/2003 | Fujie et al. | |
| 2004/0177218 A1* | 9/2004 | Meehan et al. | 711/114 |
| 2005/0050381 A1* | 3/2005 | Maddock | 714/5 |
| 2005/0141184 A1* | 6/2005 | Suzuki et al. | 361/683 |
| 2006/0156060 A1* | 7/2006 | Forrer et al. | 714/6 |

\* cited by examiner

*Primary Examiner*—Robert Beausoliel
*Assistant Examiner*—Philip Guyton
(74) *Attorney, Agent, or Firm*—Cardinal Law Group (57) ABSTRACT

A signal bearing medium tangibly embodying a program of machine-readable instructions executable by a processor to perform operations to read information stored in a storage system. The storage system includes a controller coupled to a plurality of type I performance class disk drives and at least one type II performance class backup disk drive. The operations include executing a first read request for a first set of information from a first type I performance class disk drive and executing a second read request for the first set of information from a first type II performance class backup disk drive in response to an occurrence of a first read error associated with the execution of the first read request.

20 Claims, 9 Drawing Sheets

COST REDUCTION SCHEMA FOR ADVANCED RAID ALGORITHMS

FIELD OF INVENTION

The present invention generally relates to Redundant Array of Independent Disks ("RAID") technology in storage systems. The present invention specifically relates to providing reliable backup for data in reduced-cost RAID storage systems.

BACKGROUND OF THE INVENTION

RAID systems are storage systems, which allow for disk drive failures without a loss of data by implementing RAID algorithms in controlling a reading and writing of data and parity/redundancy to hard disk drives ("HDD"), which may require additional HDD for redundantly storing data and parity. The additional HDD however can add significantly to the overall cost of RAID systems. Particularly, in the case of a multiple mirroring solution for increasing storage robustness of the RAID system, such as, for example, a double mirroring solution involving two (2) additional HDDs redundantly storing data and parity for each HDD. The computer industry is therefore continually striving to maximize storage robustness of RAID systems while minimizing the cost of RAID systems.

Low cost HDD's that are derived from desktop (ATA-based) class HDD families are increasingly being used in Enterprise/server class applications to achieve much lower costs of storage. However, this comes at the expense of performance and reliability. To date, their usage has been typically restricted by applications or usage recommendations to workloads typified by lower duty cycles and lower I/O rates. It is desirable to intermix enterprise/server and desktop technologies without degrading performance and reliability of the systems.

SUMMARY OF THE INVENTION

In light of the above described issues, the present invention encompasses an intermixing of Enterprise/server and desktop technologies in RAID arrays by modifying the RAID algorithms to thereby appropriately direct I/O traffic to the HDD's whereby the activity on the desktop class drives can be minimized and reliability on the desktop class drives can be maximized.

One form of the present invention is a signal bearing medium tangibly embodying a program of machine-readable instructions executable by a processor to perform operations to read information stored in a storage system. The storage system includes a controller coupled to a plurality of type I performance class disk drives and at least one type II performance class backup disk drive. The operations include executing a first read request for a first set of information from a first type I performance class disk drive and executing a second read request for the first set of information from a first type II performance class backup disk drive in response to an occurrence of a first read error associated with the execution of the first read request.

A second form of the present invention is a controller including a processor and a memory storing instructions operable with the processor to read information stored in a storage system. The storage system includes a plurality of type I performance class disk drives and at least one type II performance class backup disk drive. The instructions include executing a first read request for a first set of information from a first type I performance class disk drive and executing a second read request for the first set of information from a first type II performance class backup disk drive in response to an occurrence of a first read error associated with the execution of the first read request.

A third form of the present invention is a storage system including a plurality of type I performance class disk drives and a plurality of type II performance class backup disk drives. Each type I performance class disk drive is interfaced with at least one type II performance class backup disk drive. A controller is interfaced with the plurality of type I performance class disk drives and includes a processor and memory storing instructions operable with the processor to read information stored within the storage system. The instructions include executing a first read request for a first set of information from a first type I performance class disk drive and executing a second read request for the first set of information from a first type II performance class backup disk drive in response to an occurrence of a first read error associated with the execution of the first read request.

The forgoing forms as well as other forms, objects and aspects as well as features and advantages of the present invention will become further apparent from the following detailed description of various embodiments of the present invention, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

A storage system in accordance with the principles of the present invention is implemented either as a host-based system or a controller-based system. A host-based system employs a host computer running RAID software for executing a conventional RAID algorithm in executing a write request or a read request for information, such as data and/or parity, involving an X number of high performance class disk drives, where $X \geq 2$, and a Y number of lower performance, less expensive disk drives, where Y≧1. High performance class disk drives include Fiber Channel disk drives in a RAID array and are referred to herein as Enterprise HDD, Server HDD. Lower performance, less expensive disk drives include desktop class disk drives, such as AT Attachment ("ATA") backup storage disk drives and Serial ATA disk drives ("S-ATA").

A controller-based system employs a RAID storage controller for executing a conventional RAID algorithm, as prompted by a host computer, in executing a write request or a read request for information, such as, data and/or parity, involving the X number of disk drives in a RAID array, and the Y number of ATA backup disk drives. Currently, the ATA storage disk drives are typically about one-third (⅓) the cost of the type I performance class disk drives.

The term "type I performance class disk drive" is defined herein as a high performance class disk drive, including server class disk drives and fiber channel disk drives. Enterprise HDD and Server HDD are examples of type I performance class disk drives. The term "type II performance class backup disk drive" is defined herein as a lower class performance disk drive, such as a desktop class disk drive, e.g., ATA or Serial ATA disk drives.

In alternative embodiments, the storage system in accordance with the principles of the present invention is implemented in a RAID adapter, a RAID chip on a motherboard or an external RAID subsystem.

Figure 1:
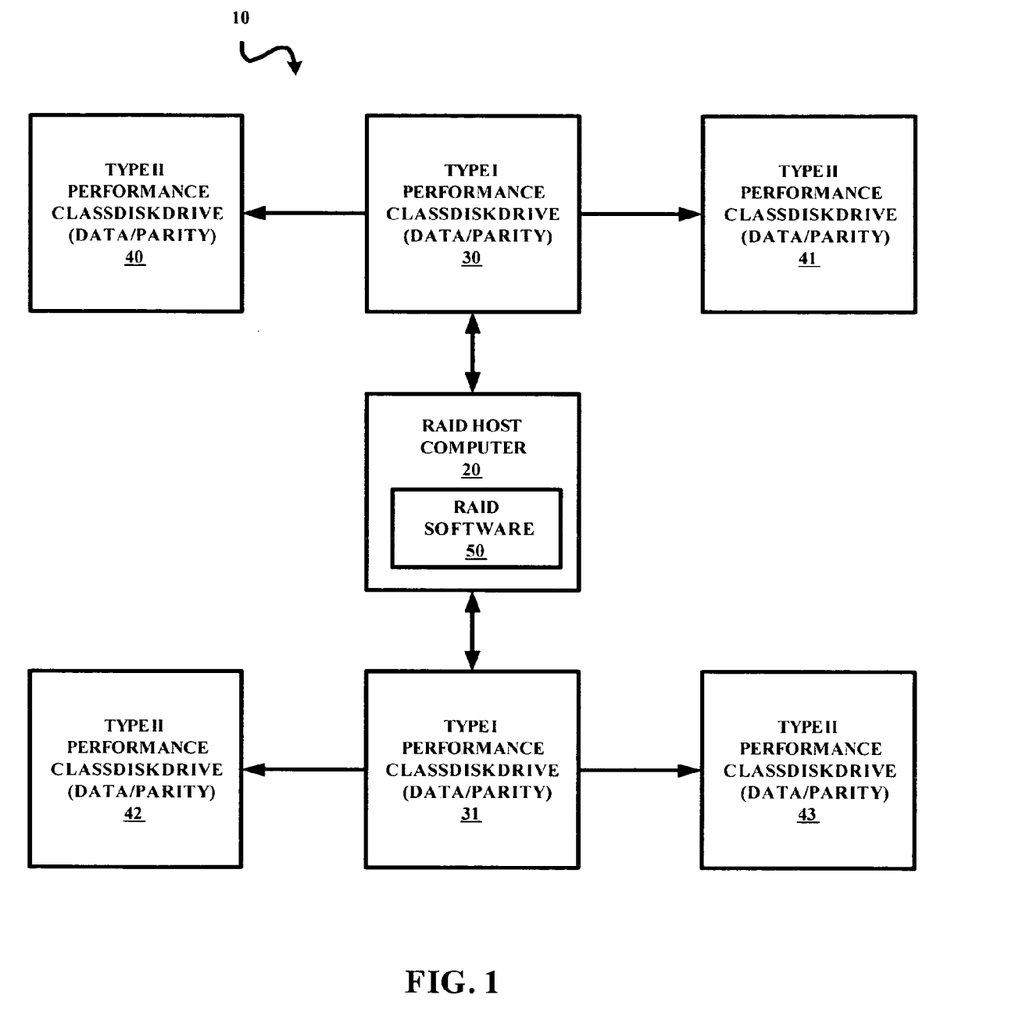
FIG. 1 illustrates a first embodiment of a storage system in accordance with the present invention.

FIG. 1 illustrates a storage system 10 as an exemplary host-based double-mirror RAID system under the principles of the present invention where X=2 and Y=2. As shown, storage system 10 employs a RAID host computer 20 interfaced to a type I performance class disk drive 30 and a type I performance class disk drive 31 via conventional interface channels (e.g., SCSI interface and Fiber Channel interfaces). RAID host computer 20 includes a controller (not shown) interfaced with the type I performance class disk drives. The controller includes a processor (not shown) and memory (not shown) storing machine-readable instructions operable with the processor to read information stored within the storage system 10.

Type I performance class disk drive 30 is interfaced with a type II performance class backup disk drive 40 and a type II performance class backup disk drive 41 via conventional desktop interfaces or appropriate converted interface channels (e.g., ATA interface channels). Type I performance class disk drive 31 is interfaced with a type II performance class backup disk drive 42 and a type II performance class backup disk drive 43 via conventional desktop interfaces or appropriate converted interface channels.

Figure 5:
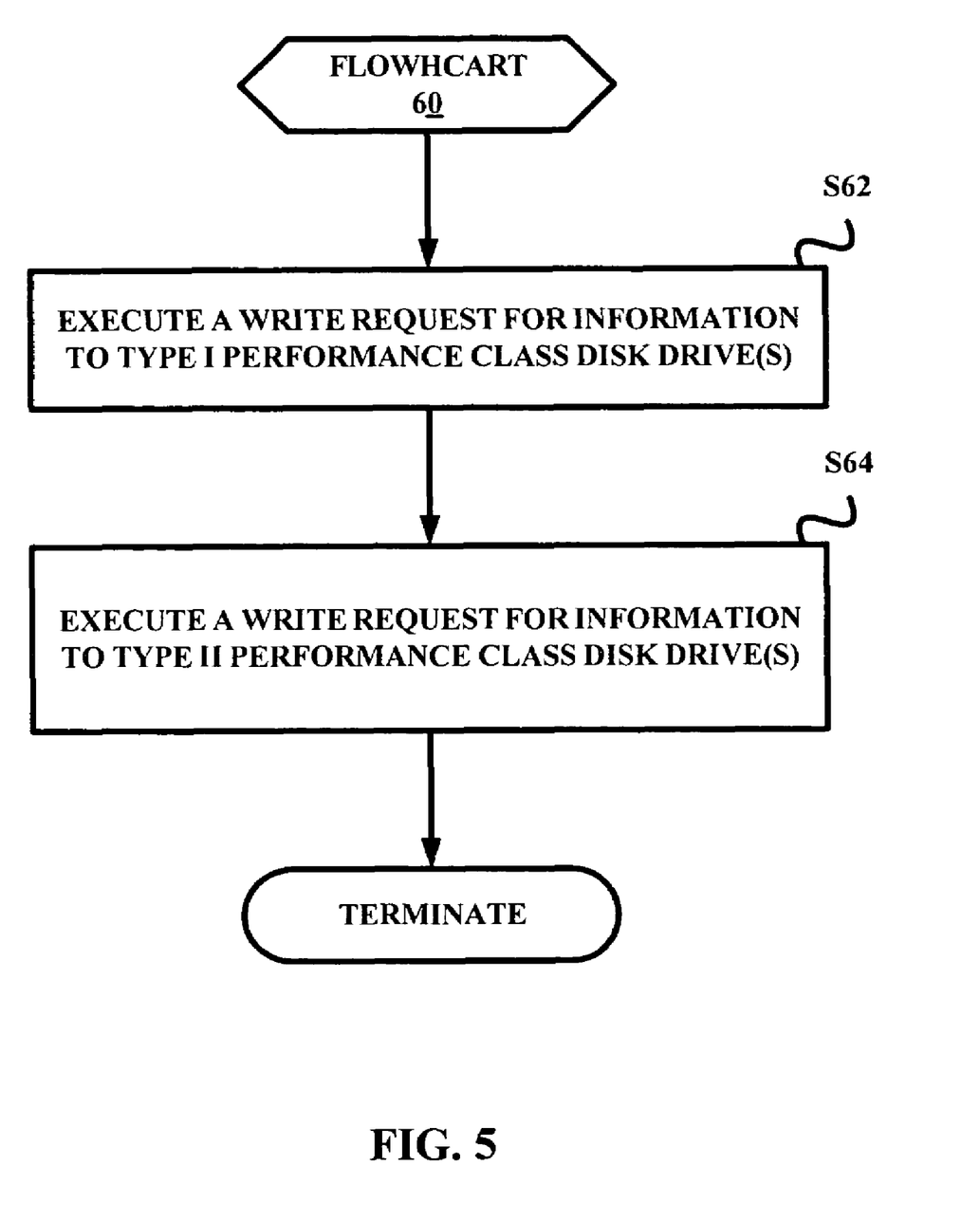
FIG. 5 illustrates a flow chart representative of a baseline embodiment for establishing storage backup in accordance with the present invention.

RAID host computer 20 implements a RAID software 50 having conventional instructions in accordance with one or more well known RAID algorithms, including double-mirror RAID algorithms, for executing write requests for information, including data and/or parity, involving disk drives 30, 31, and 40-43 as will be further explained herein with respect to a description of FIG. 5. RAID software 50 further includes new and unique machine-readable instructions for executing read requests for information, including data and/or parity, involving disk drives 30, 31, and 40-43 as will be further explained herein with respect to a description of FIG. 6.

In one embodiment, storage system 10 is implemented as a host based RAID system whereby the software and hardware that controls the RAID algorithms and I/O's are on the chip on a motherboard. In an alternative embodiment, storage system 10 is implemented as a RAID adapter attaching storage whereby the software and hardware that controls the RAID algorithms and I/O's are one or more adapter cards. In a further alternative embodiment, storage system 10 is implemented as a thin adapter attaching RAID subsystem.

Figure 2:
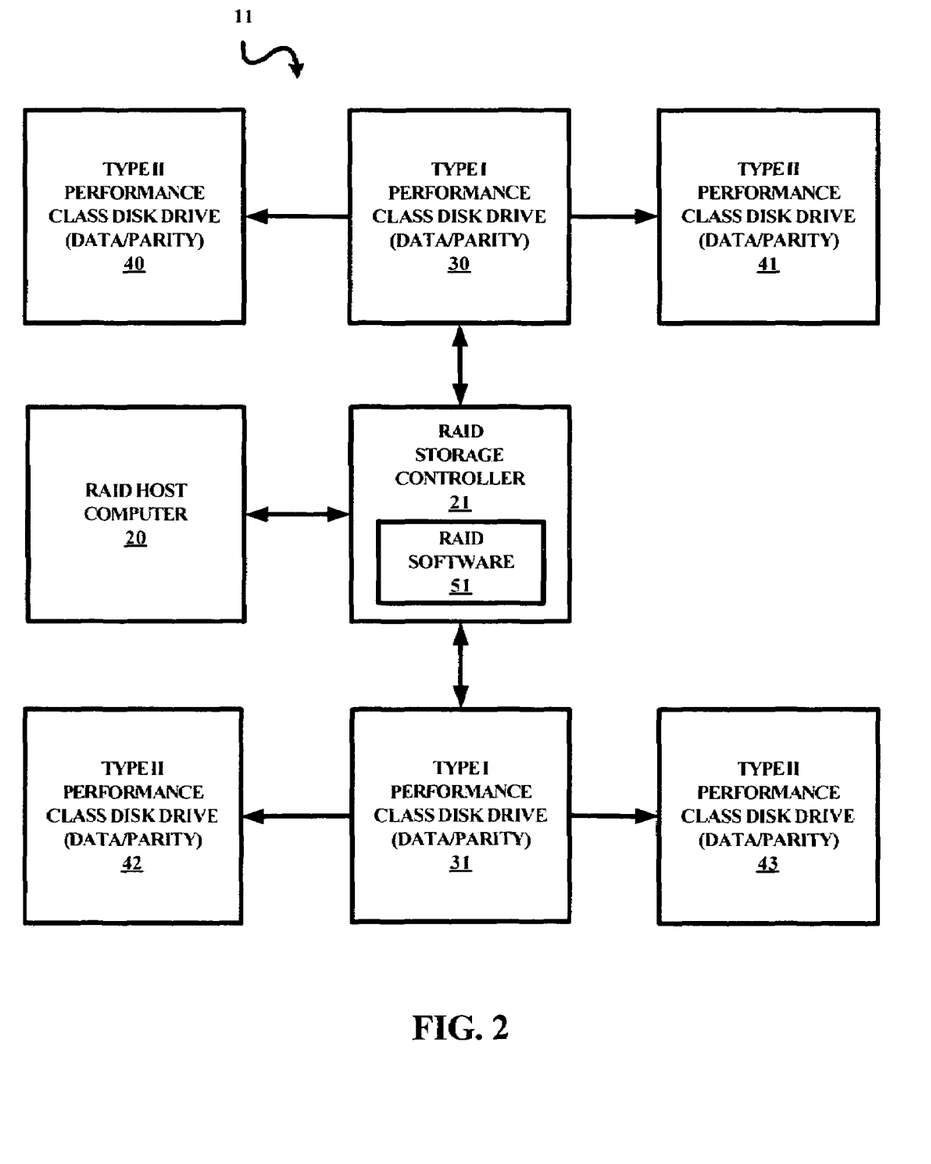
FIG. 2 illustrates a second embodiment of a storage system in accordance with the present invention.

FIG. 2 illustrates a storage system 11 as an exemplary controller-based double-mirror RAID system under the principles of the present invention where X=2 and Y=2. As shown, storage system 11 employs RAID host computer 20 conventionally interfaced to RAID storage controller 21, which is conventionally interfaced to type I performance class disk drive 30 and type I performance class disk drive 31. Again, type I performance class disk drive 30 is conventionally interfaced with a type II performance class backup disk drive 40 and a type II performance class backup disk drive 41 via conventional desktop interface or appropriate converted interface channels. Type I performance class disk drive 31 is conventionally interfaced with a type II performance class backup disk drive 42 and a type II performance class backup disk drive 43 via conventional desktop interface or appropriate converted interface channels.

Controller 21 includes a processor (not shown) and memory (not shown) storing machine-readable instructions operable with the processor to read information, including data and/or parity, stored within the storage system 11. Controller 21 implements RAID software 51 having conventional instructions in accordance with one or more well known RAID algorithms, including double-mirror RAID algorithms, for executing write requests for information involving disk drives 30, 31, and 40-43 as will be further explained herein with respect to a description of FIG. 5. RAID software 51 further includes new and unique instructions for executing read requests for information involving disk drives 30, 31, and 40-43 as will be further explained herein with respect to a description of FIG. 6.

In one embodiment, storage system 11 is implemented as a host based RAID system whereby the software and hardware that controls the RAID algorithms and I/O's are on the chip on a motherboard. In an alternative embodiment, storage system 11 is implemented as a RAID adapter attaching storage whereby the software and hardware that controls the RAID algorithms and I/O's are one or more adapter cards. In a further alternative embodiment, storage system 11 is implemented as a thin adapter attaching RAID subsystem.

Figure 3:
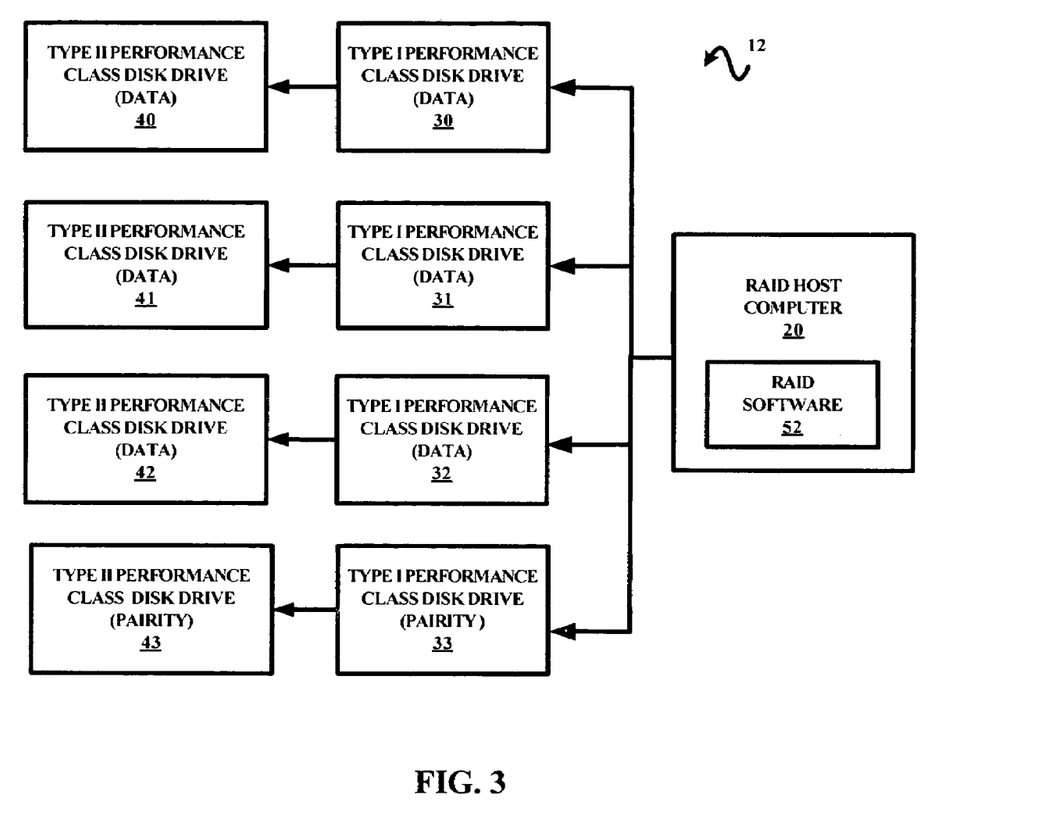
FIG. 3 illustrates a third embodiment of a storage system in accordance with the present invention.

FIG. 3 illustrates a storage system 12 as an exemplary host-based RAID 51 storage system under the principles of the present invention where X=4 and Y=4. As shown, storage system 12 employs RAID host computer 20 interfaced to type I performance class disk drives 30-33 via conventional interface channels. RAID host computer 20 includes a controller (not shown) interfaced with the type I performance class disk drives. The controller includes a processor (not shown) and memory (not shown) storing machine-readable instructions operable with the processor to read information stored within the storage system 12.

Type I performance class disk drives 30-32 contain data, and respectively conventionally interfaced type II performance class disk drives 40-42 contain redundant data. Type I performance class disk drive 33 contains parity for the data in type I performance class disk drives 30-32, and conventionally interfaced type II performance class backup disk drive 43 contains redundant parity for data in the type II performance class back up disk drives 40-42.

RAID host computer 20 implements RAID software 52 having conventional instructions in accordance with one or more well known RAID algorithms, including RAID 51, for executing write requests for data involving disk drives 30-32 and 40-42 and for executing write requests for parity involving disk drives 33 and 43 as will be further explained herein with respect to a description of FIG. 5. RAID software 52 further includes new and unique instructions for executing read requests for data involving disk drives 30-32 and 40-42 and for executing read requests of parity involving disk drives 33 and 43 as will be further explained herein with respect to a description of FIG. 6.

In one embodiment, storage system 12 is implemented as a host based RAID system whereby the software and hardware that controls the RAID algorithms and I/O's are on the chip on a motherboard. In an alternative embodiment, storage system 12 is implemented as a RAID adapter attaching storage whereby the software and hardware that controls the RAID algorithms and I/O's are one or more adapter cards. In a further alternative embodiment, storage system 12 is implemented as a thin adapter attaching RAID subsystem.

Figure 4:
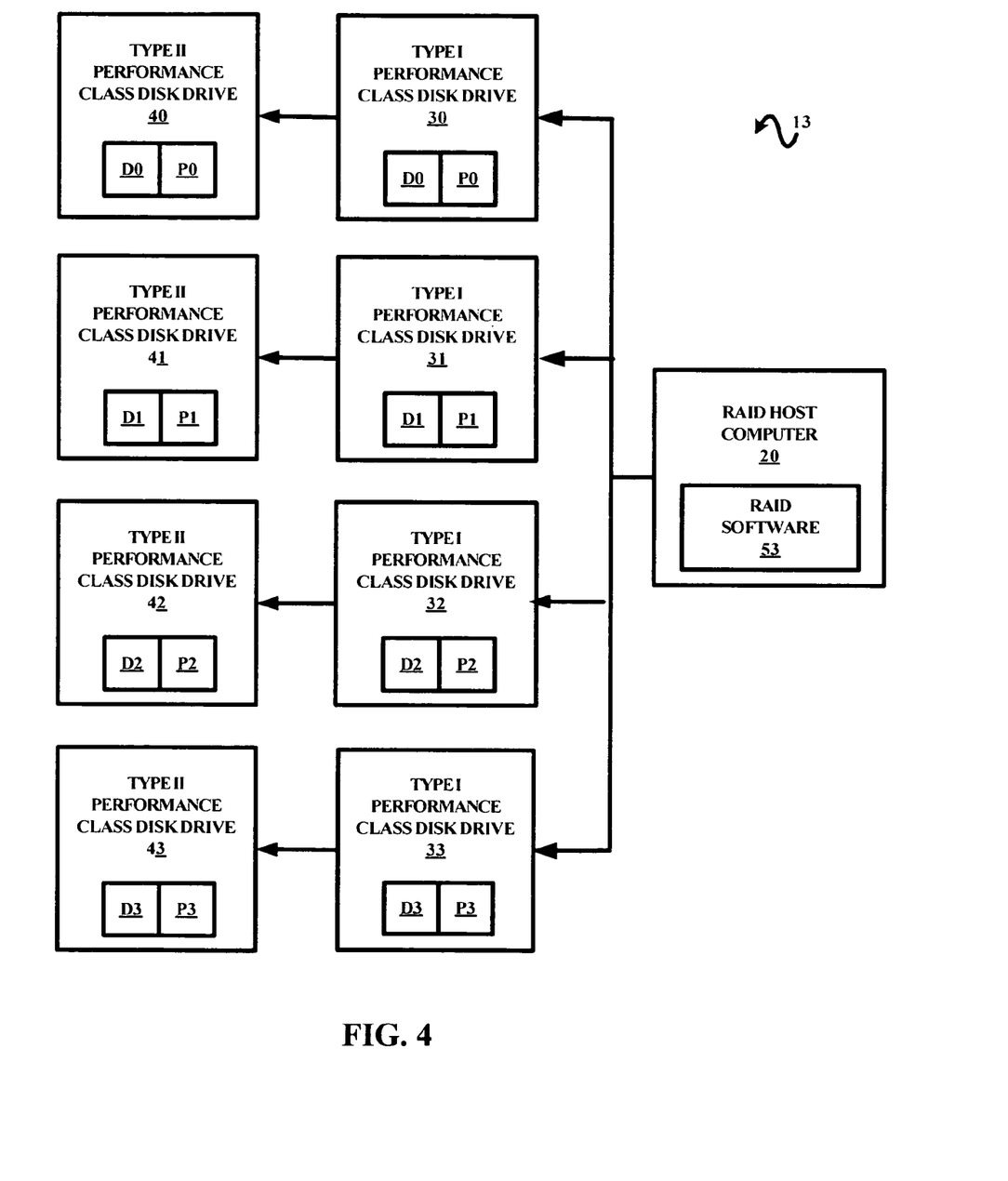
FIG. 4 illustrates a fourth embodiment of a storage system in accordance with the present invention.

FIG. 4 illustrates a storage system 13 as an exemplary host-based RAID 10 storage system under the principles of the present invention where X=4 and Y=4. In storage system 13, the data is striped across the RAID storage system whereby a data block consisting of data segments D0-D3 and a parity block consisting of parity segments P0-P3 are distributed across type I performance class disk drives 30-33 and type II performance class backup disk drives 40-43 as shown.

RAID host computer 20 includes a controller (not shown) interfaced with the type I performance class disk drives. The controller includes a processor (not shown) and memory (not shown) storing machine-readable instructions operable with the processor to read information stored within the storage system 13. The information includes of at least one of a data block and a parity block, such as, data segments D0-D3 and parity segments P0-P3. RAID host computer 20 implements a RAID software 53 having conventional instructions in accordance with one or more well known RAID algorithms, including RAID 10, for executing write requests for data segments D0-D3 and parity segments P0-P3 involving type I performance class disk drives 30-33 and type II performance class backup disk drives 40-43 as will be further explained herein with respect to a description of FIG. 5. RAID software 53 further includes new and unique instructions for executing read requests for data segments D0-D3 and parity segments P0-P3 involving type I performance class disk drives 30-33 and type II performance class backup disk drives 40-43 as will be further explained herein with respect to a description of FIG. 6.

In one embodiment, storage system 13 is implemented as a host based RAID system whereby the software and hardware that controls the RAID algorithms and I/O's are on the chip on a motherboard. In an alternative embodiment, storage system 13 is implemented as a RAID adapter attaching storage whereby the software and hardware that controls the RAID algorithms and I/O's are one or more adapter cards. In a further alternative embodiment, storage system 13 is implemented as a thin adapter attaching RAID subsystem.

Execution of write request instructions and read request instructions of information within storage system 10 (FIG. 1), storage system 11 (FIG. 2), storage system 12 (FIG. 3) and storage system 13 (FIG. 4) will now be described herein. To facilitate an understanding of the present invention, examples of executions of these write request instructions and read request instructions for information will be provided in the context of storage systems 10-13. From this description, those having ordinary skill in the art will appreciate the scope of the write request instructions and the read request instructions as applied throughout systems 10-13 as well as the scope of the write request instructions and the read request instructions as applied to other storage systems in accordance with the present invention.

FIG. 5 illustrates a flowchart 60 representative of a storage backup of information within a storage system of the present invention. First, a conventional write request for information, such as, data and/or parity, to one or more type I performance class disk drives is executed during a stage S62 of flowchart 60.

In the context of storage system 10 (FIG. 1), an exemplary implementation of stage S62 involves an execution by RAID host computer 20 of a write request for data and/or parity to type I performance class disk drive 30.

In the context of storage system 10 (FIG. 2), an exemplary implementation of stage S62 involves an execution by RAID storage controller 21 of a write request for data and/or parity to type I performance class disk drive 30.

In the context of storage system 12 (FIG. 3), an exemplary implementation of stage S62 involves an execution by RAID host computer 20 of a write request for data to type I performance class disk drive 30 and/or an execution by RAID host computer 20 of a write request for parity to type I performance class disk drive 33.

In the context of storage system 13 (FIG. 4), an exemplary implementation of stage S62 involves an execution by RAID host computer 20 of a write request for data segments D0-D3 and/or parity segments P0-P3 to type I performance class disk drives 30-33, respectively.

Second, a conventional write request for information to the type II performance class backup disk drives associated with type I performance class disk drives of stage S62 is executed during a stage S64 of flowchart 60.

In the context of storage systems 10 and 11 (FIGS. 1 and 2), an exemplary implementation of stage S64 involves an execution by type I performance class disk drive 30 of a write request for data and/or parity to type II performance class backup disk drives 40 and 41.

In the context of storage system 12 (FIG. 3), an exemplary implementation of stage S64 involves an execution by type I performance class disk drive 30 of a write request for data to type II performance class backup disk drive 40 and/or an execution by type I performance class disk drive 33 of a write request for parity to type II performance class backup disk drive 43.

In the context of storage system 13 (FIG. 4), an exemplary implementation of stage S64 involves an execution by type I performance class disk drives 30-33 of a write request for data segments D0-D3 and/or parity segments P0-P3 to type II performance class backup disk drives 40-43, respectively.

Flowchart 60 is terminated upon completion of stage S64. An occurrence of any write errors during the implementation of either stage S62 and/or stage S64 is resolved in a conventional manner and therefore outside the scope of the present invention.

Figure 6:
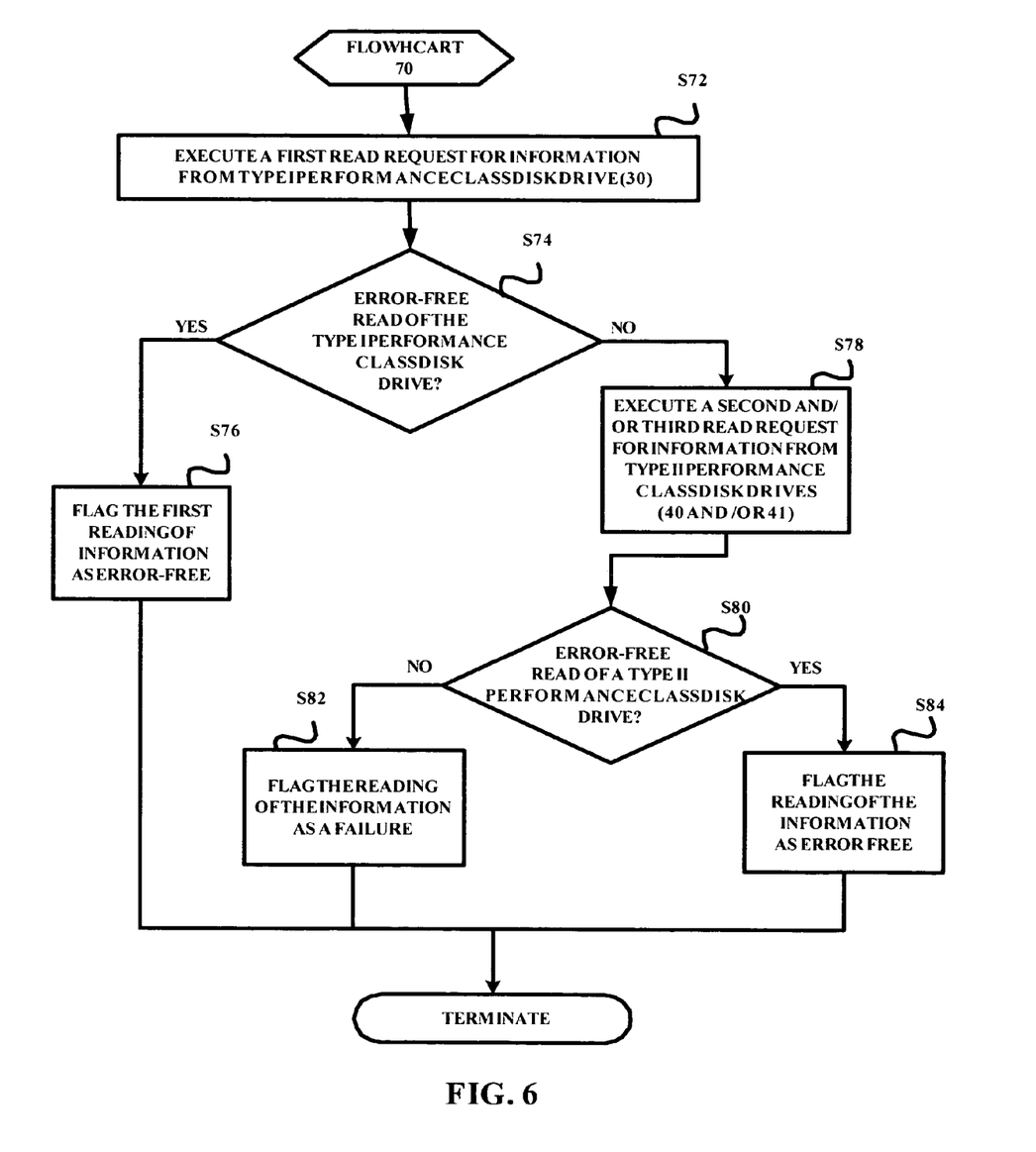
FIG. 6 illustrates a flow chart representative of a baseline embodiment for retrieving error-protected data in accordance with the present invention.

FIG. 6 illustrates a flowchart 70 representative of a storage retrieval of information within a storage system of the present invention. First, a conventional first read request for information from a type I performance class disk drive is executed during a stage S72 of flowchart 70.

In the context of storage system 10 (FIG. 1), an exemplary implementation of stage S72 involves an execution by RAID host computer 20 of a read request for data and/or parity from type I performance class disk drive 30.

In the context of storage system 11 (FIG. 2), an exemplary implementation of stage S72 involves an execution by RAID storage controller 21 of a read request for data and/or parity from type I performance class disk drive 30.

In the context of storage system 12 (FIG. 3), an exemplary implementation of stage S72 involves an execution by RAID host computer 20 of a read request for data from type I performance class disk drive 30 and/or an execution by RAID host computer 20 of a read request for parity from type I performance class disk drive 33.

In the context of storage system 13 (FIG. 4), an exemplary implementation of stage S72 involves an execution by RAID host computer 20 of a read request for data segment D0 and/or parity segment P0 from type I performance class disk drive 30.

During a stage S74 of flowchart 70, it is determined whether a read error (e.g., a permanent read error or a long recovery read error) occurred during the execution of the first read request for information from the type I performance class disk drive during stage S72. If an error-free read occurred during stage S72, then the reading of the information from the type I performance class disk drive is flagged as error-free during a stage S76 of flowchart 70 to thereby allow for the retrieved information to subsequently be processed as needed upon termination of flowchart 70.

If a read error did occur during stage S72, then conventional second and/or third read requests for information from the type II performance class backup disk drives interfaced with the type I performance class disk drive of stage S72 are executed during a stage S78 of flowchart 70.

In the context of storage systems 10 and 11 (FIGS. 1 and 2), an exemplary implementation of stage S78 involves an execution by type I performance class disk drive 30 of a second and third read request for data and/or parity from type II performance class backup disk drives 40 and 41, respectively.

In the context of storage system 12 (FIG. 3), an exemplary implementation of stage S78 involves an execution by type I performance class disk drive 30 of a second read request for data from type II performance class backup disk drive 40 and/or an execution by type I performance class disk drive 33 of a third read request for parity from type II performance class backup disk drive 43.

In the context of storage system 13 (FIG. 4), an exemplary implementation of stage S78 involves an execution by type I performance class disk drive 30 of a second read of data segment D0 and/or parity segment P0 from type II performance class backup disk drive 40. In this embodiment, a third read request is not executed.

During a stage S80 of flowchart 70, it is determined whether a read error (e.g., a permanent read error or a long recovery read error) occurred during the execution of the read request for information from the type II performance class backup disk drive(s) during stage S78. If a read error did occur during stage S78, then the reading of the information from the type I performance class disk drive is flagged as a failure during a stage S82 of flowchart 80 to thereby allow for a failure notification and/or subsequent readings of other information from the type I performance class disk drive upon termination of flowchart 70.

If an error-free read occurred for a type II performance class backup disk drive during stage S78, then the reading of the information from that type II performance class backup disk drive is flagged as error-free during a stage S84 of flowchart 70 to thereby allow for the retrieved information to subsequently be processed as needed upon termination of flowchart 80.

Those having ordinary skill in the art will appreciated the numerous benefits of flowchart 70 in facilitating an intermixing of Enterprise/server and desktop technologies in RAID arrays to thereby appropriately direct I/O traffic to the HDD's whereby the activity on the desktop class drives can be minimized and reliability on the desktop class drives can be maximized.

Figure 7:
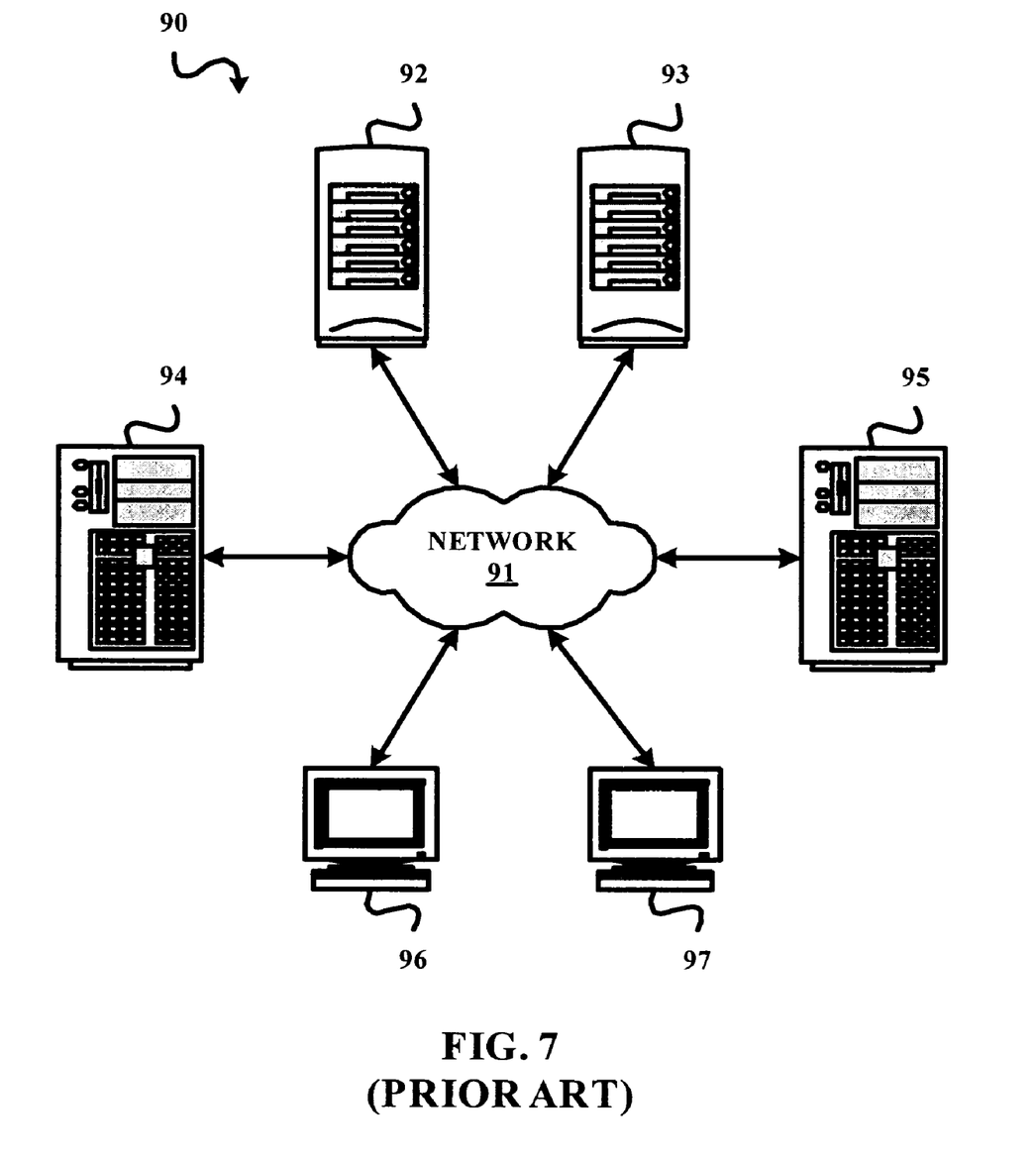
FIG. 7 illustrates an exemplary distributed data processing network as known in the art for practicing the present invention.

With reference now to a practical implementation of the present invention, FIG. 7 depicts a distributed data processing network 90 employing a network 91, which is the media used to provide communications links between various devices and computers connected together within distributed data processing network 90. Network 91 may include permanent connections, such as wire or fiber optic cables, or temporary connections made through telephone or wireless communications.

In the depicted example, a storage system 92, a storage system 93, a server 94, a server 95, a client 96 and a client 97 are connected to network 91. Storage system 92 and storage system 93 represent a storage system in accordance with the present invention, such as, for example, storage system 10 (FIG. 1), storage system 11 (FIG. 2), storage system 12 (FIG. 3) and storage system 13 (FIG. 4). In one embodiment, storage system 92 and/or storage system 93 are storage area networks (SAN). Servers 94 and 95, and clients 96 and 97 represent a variety of conventional computing devices, such as mainframes, personal computers, personal digital assistants (PDAs), etc. Distributed data processing network 90 may include more or less storage systems, servers and clients as shown as well as additional networks, routers, and other devices as would occur to those having ordinary skill in the art.

Distributed data processing network 91 may include the Internet with network 91 representing a worldwide collection of networks and gateways that use the TCP/IP suite of protocols to communicate with one another. Of course, distributed data processing network 91 may also include a number of different types of networks, such as, for example, an intranet, a local area network (LAN), or a wide area network (WAN).

The present invention could be implemented on a variety of hardware platforms. FIG. 7 is intended as an example of a heterogeneous computing environment and not as an architectural limitation for the present invention.

Figure 8:
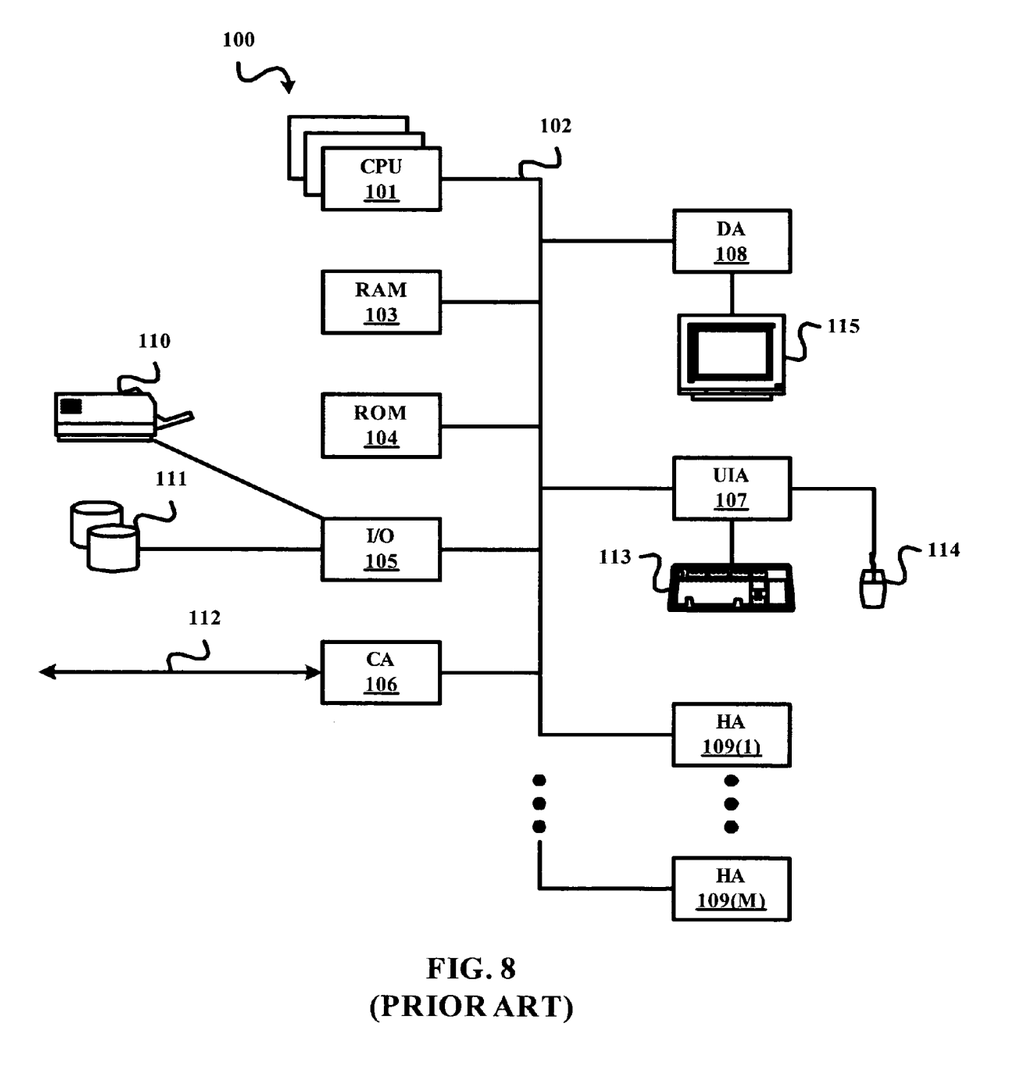
FIG. 8 illustrates an exemplary computer architecture of a RAID host computer as known in the art for practicing the present invention.

FIG. 8 illustrates an exemplary computer architecture 100 of a RAID host computer in which the present invention may be implemented (e.g., RAID host computer 20 shown in FIGS. 1-4). Computer architecture 100 employs one or more central processing units ("CPU") 101 connected to the signal bearing medium provided by internal system bus 102, which interconnects random access memory ("RAM") 103, read-only memory ("ROM") 104, and input/output adapter ("I/O") 105, which supports various I/O devices, such as printer 110, disk units 111, or other devices not shown, such as a sound system, etc. A communication adapter ("CA") 106, a user interface adapter ("UIA") 107, and a display adapter ("DA") 108 are also connected to bus 102. Communication adapter 106 provides bus 102 with access to the signal bearing medium provided by communication link 112 to a network (e.g., network 91 shown in FIG. 7). User interface adapter 107 connects bus 102 to various user input devices, such as keyboard 113 and mouse 114, or other devices not shown, such as a touch screen, stylus, etc. Display adapter 108 connects bus 102 to a display device 115. Additionally, M number of host adapters ("HA") 109 are connected to bus 102 to provide access to RAID storage controllers (e.g., RAID storage controller 21 shown in FIG. 2) and type I performance class disk drives in a RAID array (e.g., type I performance class disk drives 30-33 shown in FIGS. 1-4).

Figure 9:
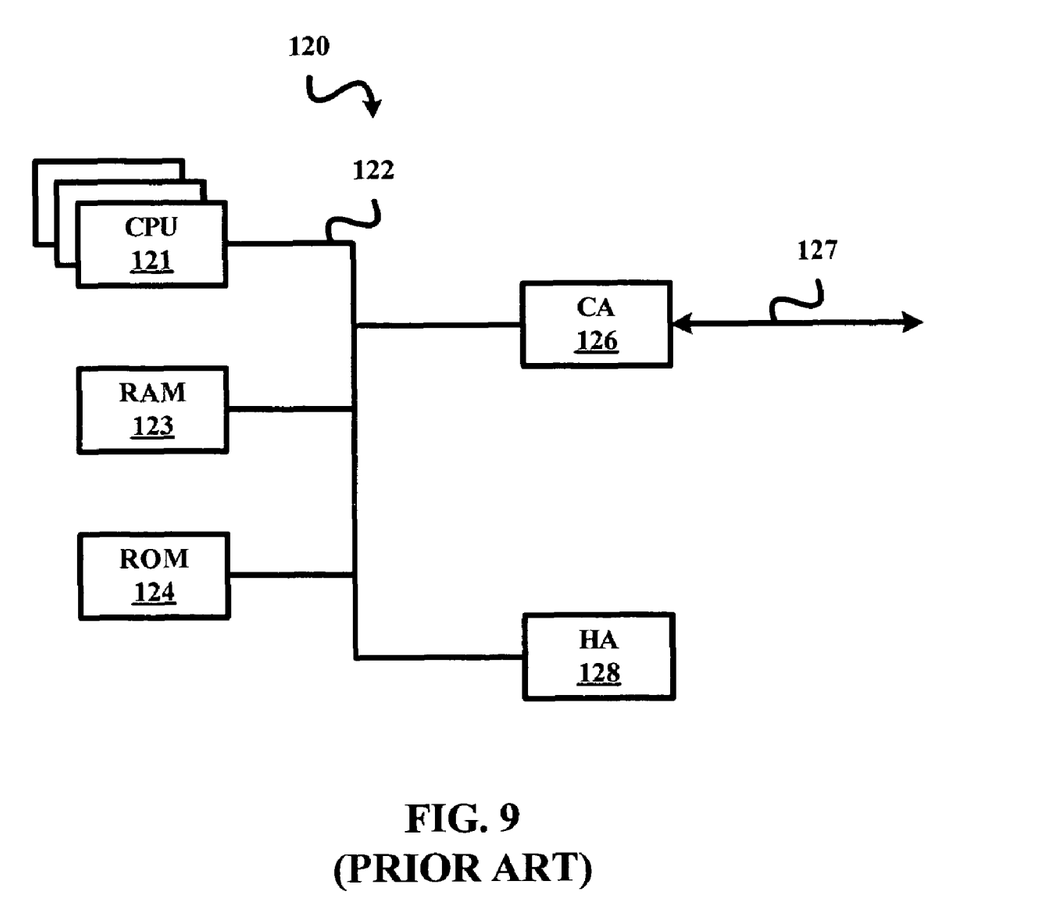
FIG. 9 illustrates an exemplary computer architecture of a RAID storage controller as known in the art for practicing the present invention.

FIG. 9 illustrates an exemplary computer architecture 120 of a RAID storage controller in which the present invention may be implemented (e.g., RAID storage controller 21 shown in FIG. 2). Computer architecture 120 employs one or more central processing units ("CPU") 121 connected to the signal bearing medium provided by internal system bus 122, which interconnects random access memory ("RAM") 123, and read-only memory ("ROM") 124. A communication adapter ("CA") 126 provides bus 122 with access to the signal bearing medium provided by communication link 127 with a RAID host computer (e.g., RAID host computers 20 and RAID storage controller 21 shown in FIGS. 1 and 2, respectively). Additionally, a host adapter ("HA") 128 is connected to bus 122 to provide access to type I performance class disk drives in a RAID array and type II performance class backup disk drives.

Those of ordinary skill in the art will appreciate that the hardware in FIGS. 8-10 may vary depending on the system implementation. For example, the system may have one or more processors, and other peripheral devices may be used in addition to or in place of the hardware depicted in FIGS. 8-10. The depicted example is not meant to imply architectural limitations with respect to the present invention. In addition to being able to be implemented on a variety of hardware platforms, the present invention may be implemented in a variety of software environments, such as, for example, a programming of the present invention within or on a computer readable medium whereby a conventional operating system may be used to control program execution of the present invention within the data processing system. Those having ordinary skill in the art will appreciate various software languages that can be employed in writing software code for the various users interfaces of the present invention.

What is claimed is:

1. A computer usable medium tangibly embodying a program of machine-readable instructions executable by a processor to perform operations to read information stored in a double mirror storage system comprising a controller coupled to a plurality of type I performance class disk drives and at least one type II performance class backup disk drive, wherein the type I performance class disk drives contain data blocks and parity blocks for the data blocks and wherein the type II performance class disk drives contain redundant data blocks and redundant parity blocks the operations comprising:
executing a first read request for a first set of information from a first type I performance class disk drive, wherein the information constitutes segments of at least one of the data block and the parity block;
determining a first read error associated with the execution of the first read request; and
executing a second read request for the first set of information from a first type II performance class backup disk drive wherein the controller minimizes the use of the first type II performance class drive and maximizes the use of the first type I performance drive.

2. The computer usable medium of claim 1, wherein the operations further comprise:
executing a third read request for the first set of information from a second type II performance class backup disk drive in response to the occurrence of the first read error associated with the execution of the first read request.

3. The computer usable medium of claim 2, wherein the first type I performance class disk drive comprises a server class disk drive and the first type II performance class backup disk drive comprises a desktop class disk drive.

4. The computer usable medium of claim 2, wherein the first type I performance class disk drive comprises a fiber channel disk drive and the first type II performance class backup disk drive comprises an ATA disk drive.

5. The computer usable medium of claim 1, wherein the operations further comprise:
executing a third read request for a second set of information from a second type I performance class disk drive; and
executing a fourth read request for the second set of information from a second type II performance class backup disk drive in response to an occurrence of a second read error associated with the execution of the third read request.

6. The computer usable medium of claim 5, wherein the second set of information constitute segments of at least one of a data block and a parity block.

7. A controller comprising:
a processor; and
a memory storing instructions operable with the processor to read information stored in a storage system comprising a double mirror system including plurality of type I performance class disk drives and at least one type II performance class backup disk drive wherein the type I performance class disk drives contain data blocks and parity blocks for the data blocks and wherein the type II performance class disk drives contain redundant data blocks and redundant parity blocks, the instructions being executed for:
executing a first read request for a first set of information from a first type I performance class disk drive wherein the information constitutes segments of at least one of the data block and the parity block;
determining a first read error associated with the execution of the first read request; and
executing a second read request for the first set of information from a first type II performance class backup disk drive wherein the use of the first type II performance class drive is minimized and the use of the first type I performance drive is maximized.

8. The controller of claim 7, wherein the instructions are further executed for:
executing a third read request for the first set of information from a second type II performance class backup disk drive in response to the occurrence of the first read error associated with the execution of the first read request.

9. The controller of claim 8, wherein the first type I performance class disk drive comprises a sewer class a server class disk drive and the first type II performance class backup disk drive comprises a desktop class disk drive.

10. The controller of claim 8, wherein the first type I performance class disk drive comprises a fiber channel disk drive and the first type II performance class backup disk drive comprises an ATA disk drive.

11. The controller of claim 7, wherein the instructions are further executed for:
executing a third read request for a second set of information from a second type I performance class disk drive; and
executing a fourth read request for the second set of information from a second type II performance class backup disk drive in response to an occurrence of a second read error associated with the execution of the third read request.

12. The controller of claim 11, wherein the second set of information constitutes segments of at least one of a data block and a parity block.

13. The controller of claim 7, wherein the controller is selected from the group consisting of a RAID host computer running RAID software, a RAID controller, a RAID adapter, a RAID chip on a motherboard and an external RAID subsystem.

14. A storage system, comprising:
a plurality of type I performance class disk drives;
a plurality of type II performance class backup disk drives, wherein each type I performance class disk drive is interfaced with at least one type II performance class backup disk drive in a double mirror system and wherein the type I performance class disk drives contain data blocks and parity blocks for the data blocks and wherein the type II performance class disk drives contain redundant data blocks and redundant parity blocks; and
a controller interfaced with the plurality of type I performance class disk drives, wherein the controller includes a processor and memory storing instructions operable with the processor to read information stored within the storage system, the instructions being executed for:
executing a first read request for a first set of information from a first type I performance class disk drive wherein the information constitutes segments of at least one of the data blocks and the parity blocks;
determining a first read error associated with the execution of the first read request; and
executing a second read request for the first set of information from a first type II performance class backup disk drive wherein the controller minimizes the use of the first type II performance class drive and maximizes the use of the first type I performance drive.

15. The storage system of claim 14, wherein the instructions are further executed for:
executing a third read request for the first set of information from a second type II performance class backup disk drive in response to the occurrence of the first read error associated with the execution of the first read request.

16. The storage system of claim 15, wherein the first type I performance class disk drive comprises a server class disk drive and the first type II performance class backup disk drive comprises a desktop class disk drive.

17. The storage system of claim 15, wherein the first type I performance class disk drive comprises a fiber channel disk drive and the first type II performance class backup disk drive comprises an ATA disk drive.

18. The storage system of claim 14, wherein the instructions are further executed for:
executing a third read request for a second set of information from a second type I performance class disk drive; and
executing a fourth read request for the second set of information from a second type II performance class backup disk drive in response to an occurrence of a second read error associated with the execution of the third read request.

19. The storage system of claim 18, wherein the second set of information constitute segments of at least one of a data block and a parity block.

20. The storage system of claim 14, wherein the controller is selected from the group consisting of a RAID host computer running RAID software, a RAID controller, a RAID adapter, a RAID chip on a motherboard and an external RAID subsystem.

* * * * *